(12) United States Patent
Yu

(10) Patent No.: US 8,032,604 B2
(45) Date of Patent: *Oct. 4, 2011

(54) METHODS AND SYSTEMS FOR ANALYZING EMAIL MESSAGES

(75) Inventor: Tonny Yu, Hillsborough, CA (US)

(73) Assignee: GoZoom.com, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/559,437

(22) Filed: Sep. 14, 2009

(65) Prior Publication Data

US 2010/0005149 A1    Jan. 7, 2010

Related U.S. Application Data

(62) Division of application No. 10/760,140, filed on Jan. 16, 2004, now Pat. No. 7,590,694.

(51) Int. Cl.
*G06F 15/16* (2006.01)
(52) U.S. Cl. ........................... 709/206; 709/207
(58) Field of Classification Search ........... 709/206–207
See application file for complete search history.

(56) References Cited

U.S. PATENT DOCUMENTS

| | | | |
|---|---|---|---|
| 5,371,807 A * | 12/1994 | Register et al. | 382/159 |
| 5,694,616 A | 12/1997 | Johnson et al. | |
| 5,742,769 A | 4/1998 | Lee et al. | |
| 5,781,857 A | 7/1998 | Hwang et al. | |
| 5,809,020 A | 9/1998 | Bruckert et al. | |
| 5,822,526 A | 10/1998 | Waskiewicz | |
| 5,878,230 A | 3/1999 | Weber et al. | |
| 5,978,799 A | 11/1999 | Hirsch | |
| 5,987,609 A | 11/1999 | Hasebe | |
| 6,178,442 B1 | 1/2001 | Yamazaki | |
| 6,405,225 B1 | 6/2002 | Apfel et al. | |
| 6,405,243 B1 | 6/2002 | Nielsen | |
| 6,413,000 B1 | 7/2002 | Borcherds et al. | |
| 6,421,709 B1 | 7/2002 | McCormick | |
| 6,424,426 B1 | 7/2002 | Henry | |
| 6,438,584 B1 | 8/2002 | Powers | |
| 6,443,841 B1 | 9/2002 | Rossides | |
| 6,446,115 B2 | 9/2002 | Powers | |
| 6,446,261 B1 | 9/2002 | Rosser | |
| 6,460,075 B2 | 10/2002 | Krueger et al. | |

(Continued)

OTHER PUBLICATIONS

Ahmed, Sabbir, et al., "Word Stemming to Enhance Spam Filtering." Department of Computer Science & Engineering. University of Dhaka, Bangladesh, Jul. 1, 2004, 2 pages.

(Continued)

*Primary Examiner* — Joseph Avellino
*Assistant Examiner* — Jeong S Park
(74) *Attorney, Agent, or Firm* — Fliesler Meyer LLP

(57) ABSTRACT

Multiple modules are provided, each one of which is configured to analyze email messages in a different manner than other ones of the modules. For a received email message, a plurality of the modules are used to determine one or more module outputs indicative of a level of sameness of the received email message with one or more prior email messages. At least two of the modules being used are each assigned a non-zero weight indicative of the performance level of the module. An overall level of sameness of the received email message with one or more prior email messages is determined by combining the module outputs of at least two of the plurality of modules using the non-zero weights assigned to the modules.

27 Claims, 2 Drawing Sheets

U.S. PATENT DOCUMENTS

| | | |
|---|---|---|
| 6,473,812 B2 | 10/2002 | Motoyama |
| 6,487,586 B2 | 11/2002 | Ogilvie et al. |
| 6,502,127 B1 | 12/2002 | Edwards et al. |
| 6,522,421 B2 | 2/2003 | Chapman et al. |
| 6,526,042 B1 | 2/2003 | Pinard et al. |
| 6,529,908 B1 | 3/2003 | Piett et al. |
| 6,539,385 B1 | 3/2003 | Pollack et al. |
| 6,546,416 B1 | 4/2003 | Kirsch |
| 6,546,417 B1 | 4/2003 | Baker |
| 6,580,787 B1 | 6/2003 | Akhteruzzaman et al. |
| 6,587,871 B1 | 7/2003 | Schrader |
| 6,591,296 B1 | 7/2003 | Ghanime |
| 6,592,627 B1 | 7/2003 | Agrawal et al. |
| 6,600,750 B1 | 7/2003 | Joffe et al. |
| 6,614,551 B1 | 9/2003 | Peek |
| 6,615,241 B1 | 9/2003 | Miller et al. |
| 6,643,687 B1 | 11/2003 | Dickie et al. |
| 6,651,879 B2 | 11/2003 | Lapstun et al. |
| 6,654,787 B1 | 11/2003 | Aronson et al. |
| 6,671,718 B1 | 12/2003 | Meister et al. |
| 6,684,088 B1 | 1/2004 | Halahmi |
| 6,684,238 B1 | 1/2004 | Dutta |
| 6,691,156 B1 | 2/2004 | Drummond et al. |
| 6,732,149 B1 | 5/2004 | Kephart |
| 6,732,157 B1 | 5/2004 | Gordon et al. |
| 6,779,021 B1 | 8/2004 | Bates et al. |
| 6,842,773 B1 | 1/2005 | Ralston et al. |
| 6,845,374 B1 | 1/2005 | Oliver et al. |
| 6,952,719 B1 | 10/2005 | Harris |
| 7,020,804 B2 | 3/2006 | Burdick et al. |
| 7,158,986 B1 | 1/2007 | Oliver et al. |
| 7,162,526 B2 | 1/2007 | Dutta et al. |
| 7,194,515 B2 | 3/2007 | Kirsch |
| 7,194,681 B1 | 3/2007 | Horvitz |
| 7,206,814 B2 | 4/2007 | Kirsch |
| 7,219,148 B2 | 5/2007 | Rounthwaite et al. |
| 7,249,162 B2 * | 7/2007 | Rounthwaite et al. ........ 709/206 |
| 7,272,853 B2 | 9/2007 | Goodman et al. |
| 7,287,060 B1 | 10/2007 | McCown et al. |
| 7,289,949 B2 | 10/2007 | Warner et al. |
| 7,299,261 B1 | 11/2007 | Oliver et al. |
| 7,343,624 B1 | 3/2008 | Rihn et al. |
| 7,353,539 B2 | 4/2008 | Brawn et al. |
| 7,366,761 B2 | 4/2008 | Murray et al. |
| 7,389,413 B2 | 6/2008 | Bandini et al. |
| 7,406,502 B1 | 7/2008 | Oliver et al. |
| 7,412,723 B2 | 8/2008 | Blake et al. |
| 7,451,487 B2 | 11/2008 | Oliver et al. |
| 7,483,951 B2 | 1/2009 | Kirsch |
| 7,539,726 B1 | 5/2009 | Wilson et al. |
| 7,546,348 B2 | 6/2009 | Wilson et al. |
| 7,562,122 B2 | 7/2009 | Oliver et al. |
| 7,590,694 B2 * | 9/2009 | Yu ................. 709/206 |
| 7,653,122 B2 | 1/2010 | Siriwongpairat et al. |
| 7,665,140 B2 | 2/2010 | Oliver et al. |
| 2002/0111806 A1 * | 8/2002 | Franz et al. ................... 704/255 |
| 2003/0158725 A1 | 8/2003 | Woods |
| 2003/0212745 A1 | 11/2003 | Caughey |
| 2004/0039786 A1 * | 2/2004 | Horvitz et al. ................. 709/207 |
| 2004/0087300 A1 | 5/2004 | Lewis |
| 2004/0093384 A1 | 5/2004 | Shipp |
| 2004/0128355 A1 | 7/2004 | Chao et al. |
| 2004/0260776 A1 | 12/2004 | Starbuck et al. |
| 2005/0060643 A1 * | 3/2005 | Glass et al. ................ 715/501.1 |
| 2005/0080860 A1 | 4/2005 | Daniell et al. |
| 2005/0097179 A1 | 5/2005 | Orme |
| 2005/0102366 A1 * | 5/2005 | Kirsch .......................... 709/207 |
| 2005/0193073 A1 | 9/2005 | Mehr et al. |
| 2007/0043817 A1 | 2/2007 | Oliver et al. |
| 2008/0104187 A1 | 5/2008 | Wilson et al. |
| 2008/0104703 A1 | 5/2008 | Rihn et al. |
| 2008/0104712 A1 | 5/2008 | Oliver et al. |
| 2008/0133686 A1 | 6/2008 | Wilson et al. |
| 2008/0147857 A1 | 6/2008 | Oliver et al. |
| 2008/0189253 A1 | 8/2008 | Oliver et al. |
| 2009/0089272 A1 | 4/2009 | Oliver et al. |

OTHER PUBLICATIONS

Graham-Cumming, John, "Welcome to POPFile," SourceForge™. net; © 2001-2004; 5 pages, http://popfile.sourceforgenet/old_index.html.

Graham, Paul, "A Plan for Spam," Aug. 2002, http://paulgraham.com/spam.html, pp. 1-8.

Moore, Charles, et al., "Mailshell™, the OEM Anti-Spam Leader," date unknown, 1 page, http://www.mailshell.com/mail/client/oem2.html/step/ip.

Oudot, Laurent, "Fighting Spammers with Honeypots: Parts 1 and 2," Nov. 26, 2003, 15 pages.

Sahimi et al., "A Bayesian Approach to Filtering Junk E-Mail," Microsoft Research, Redmond WA, pp. 1-8.

Wallace, Shawn, "Programming Web Graphics with Perl and GNU Software," O'Reilly Media, Feb. 1, 1999, pp. 1-5.

Yerzunis, Bill, et al., Spam Conference 2005 Abstracts, 14 pages, http://spamconference.org/abstracts.html.

SpamSieve Manual. Http://web.archive.org/web/20031002044913/www.c-command.com/spamsieve/manual.shtml, Oct. 2003.

* cited by examiner

METHODS AND SYSTEMS FOR ANALYZING EMAIL MESSAGES

PRIORITY CLAIM

This application is a continuation of U.S. patent application Ser. No. 10/760,140, entitled "System for Determining Degrees of Similarity in Email Message Information", filed Jan. 16, 2004, which is incorporated herein by reference.

COPYRIGHT NOTICE

A portion of the disclosure recited in the specification contains material which is subject to copyright protection. Specifically, a Source Code Appendix is provided that includes source code instructions for a process by which the present invention is practiced in a computer system. The copyright owner has no objection to the facsimile reproduction of the specification as filed in the Patent and Trademark Office. Otherwise all copyright rights are reserved.

BACKGROUND OF THE INVENTION

Although electronic mail, or email, has become immensely popular and is a huge benefit for many users, today's email systems are also plagued by increasing numbers of unwanted mail, referred to as "spam." Spam email has reached such large proportions with respect to desired email that systems are now sought to defeat the sending and delivery of spam.

For example, one approach is to design "filters" to block spam before it is received in a user's email in-box. The filters use different user-designed criteria such as detecting a sender's name, or a word or phrase used in a subject header. Filters can also be used to sort email into separate folders once the email has been received by a user so that the user can ignore folders into which spam is sorted. These approaches are not without shortcomings since the filters typically work on keyword matching or common and relatively easy to detect syntax or language features. Spam emailers have developed ways to thwart simple filter approaches. Sophisticated spam senders can use processes to modify an original email messages into different variations that each communicate essentially the same message. Typically the message is designed to sell something to a recipient, or is designed to provide other commercial advantage to the spam emailer.

For example, one line in an email message might be "buy this now." The line can be modified to "you should try this now." Other properties of the message can be modified such as the order of sentences, addition or removal of words or phrases, changes in spacing or other message formatting, etc. Since the modified spam email messages are different, it is difficult for simple spam detection routines to successfully identify a primary characteristic of spam email, namely, that the email is sent in large number such as thousands, hundreds of thousands or more instances of the same message. Such high-volume email is referred to as "bulk" email. Spam emailers can also use such approaches to change other characteristics of an email message, such as sender identification, routing information and other information that may be associated with an email message that could otherwise help determine that the email message is a bulk emailing and is likely to be spam.

Spam detection is further complicated because all bulk emailings are not necessarily spam. For example, if thousands of users desire to be informed of daily weather from a weather source then the messages are likely to be the same or similar, depending on the regional location of the users. Even though such email would qualify as bulk email it would not be considered spam. Still other users may actually desire to receive certain types of commercial email that would be considered spam by other users. Today's email filter and anti-spam systems often fail to provide for such conditions.

Thus, it is desirable to improve detection of bulk and/or spam email.

SUMMARY OF THE INVENTION

A preferred embodiment of the invention provides for detection of "bulk" email by comparing email messages to one another to determine if the email messages should be considered essentially the same message. If a category of "same" messages meets a predetermined criteria, such as the total number of messages in the category exceeding a predefined number, then the messages are considered bulk messages. Once a determination is made that email messages are bulk email messages then further analysis can be performed to determine if the bulk email is unwanted, or "spam." Depending on the spam determination further action can be taken, such as preventing the messages from delivery.

A determination of "sameness" for purposes of both bulk and spam classifications can use any number and type of evaluation modules. Each module can include one or more rules, tests, processes, algorithms, or other functionality. For example, one type of module may be a word count of email message text. Another module can use a weighting factor based on groups of multiple words and their perceived meanings. In general, any type of module can be used. A preferred embodiment of the invention uses statistical analysis, such as Bayesian analysis, to measure the performance of different modules against a known standard, such as human manual matching. Modules that are performing worse than other modules can be valued less than modules having better performance. In this manner, a high degree of reliability can be achieved. To improve performance, if a message is determined to be the same as a previous message, the previous computations and results for that previous message can be re-used.

In one embodiment, users are provided with options to customize or regulate bulk and spam classification and subsequent actions on how to handle the classified email messages. For example, a user can set parameters to select which modules are used, set the threshold number of "same" messages requirement for classifying a group of messages as bulk, set confidence limits for classifications, set filters based on number of matches of sameness engines, set "hold" times for incoming messages pending a determination of bulk classification, etc. Messages which are already determined to be bulk do not need to be held.

One embodiment of the invention provides for a central server to distribute module performance and module related info data to different servers for use by the servers in sameness determinations. The central server handles the computation on module performance, create module related data, and can assist the servers in switching over from one module, or set of modules, to another. The switchover to a new module set can be performed over time at the direction of the central server to take into account changing characteristics of spam email, or to take into account changing tactics of spam senders.

In one embodiment the invention provides an apparatus for classifying email messages, the apparatus comprising a processor for executing instructions included in a machine-readable medium, the machine-readable medium including one or more instructions for using a plurality of modules to determine a level of sameness of a particular email message with one or more prior email messages, wherein the level of sameness is derived for the particular email message from a weighting of the outputs of the modules; one or more instructions for determining a performance level for each of the modules; one or more instructions for comparing performance levels; one or more instructions for adjusting a weighting of at least one module in response to comparing performance levels; and one or more instructions for using the level of sameness for the particular email message to classify the particular email message into a category.

In another embodiment the invention provides a method for classifying email messages, the method comprising using a plurality of modules to determine a level of sameness of a particular email message with one or more prior email messages, wherein the level of sameness is derived for the particular email message from a weighting of the outputs of the modules; determining a performance level for each of the modules; comparing performance levels; adjusting a weighting of at least one module in response to comparing performance levels; and using the level of sameness for the particular email message to classify the particular email message into a category.

DETAILED DESCRIPTION OF THE INVENTION

Figure 1:
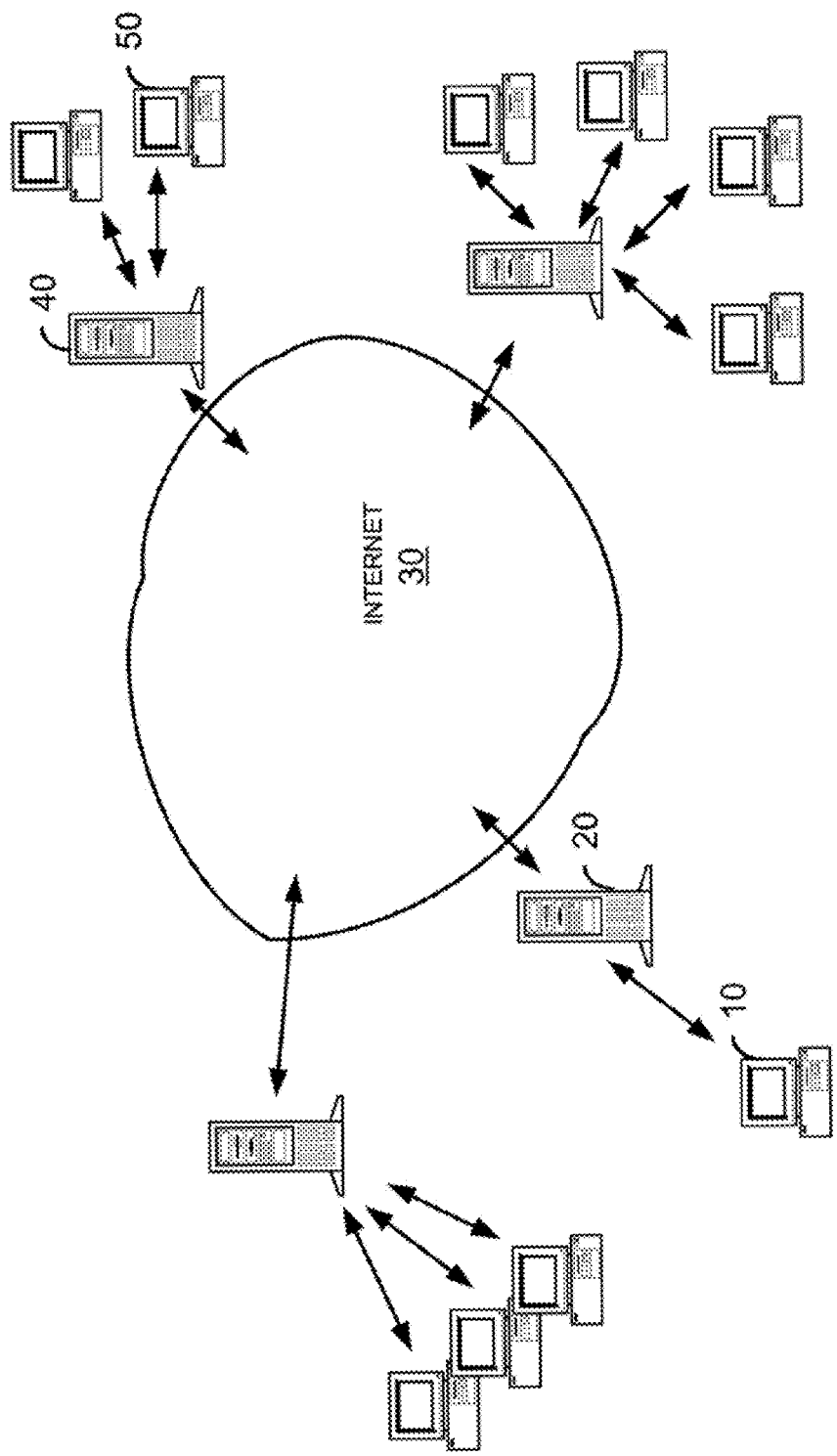
FIG. 1 is a prior art diagram of an email network.

FIG. 1 illustrates general characteristics of an email system using a digital network such as the Internet. Although the invention is discussed primarily with respect to email transferred over the Internet, any suitable network, network topology, transmission protocols, sender-receiver devices and relationships, and other characteristics or properties of electronic devices, processes and transmission methods can be used. For example, features of the invention can be employed on a smaller scale to local area networks (LANs), campus or corporate networks, home networks, etc.

In FIG. 1, a sender at a client computer such as client computer 10 can create and send an email message to email server 20. Email server 20 transfers the email over Internet 30 to receiving email server 40. Receiving email server 40 transfers the email message to the intended recipient computer 50. Note that FIG. 1 is intended to be a general depiction of one possible configuration of hardware and resources to achieve email transfer. As is known in the art, many types of devices and arrangements for email transfer are possible.

The Internet can include any number of servers, routers, switches and other devices through which the email information travels before reaching an intended recipient or other final destination (i.e., receiver). Although the invention is discussed in connection with a client/server architecture, such nomenclature is for convenience, only, as the roles and functions of any specific processor can be that of a client or server at different times. In some cases, an email server, or other type of server need not be used, or the server functions can be integrated with a client or other processing device.

Any type of processing devices can be used to send and receive email. For example, portable computing devices such as a personal digital assistant (PDA), cell phone, laptop computer, or other devices can be employed. In general, the devices and manner of specific processing (including location and timing) are not critical to practicing important features of the present invention.

A preferred embodiment of the invention uses an email server, or central server. The central server can be either of servers 20 or 40, or it can be another server through which an email message is transferred. For example, an Internet service provider (ISP) or other entity that provides email services may operate one or more email servers (not shown). In most embodiments it is desirable to have one or a few centralized points through which email traffic flows in order to be able to analyze and filter email to eliminate unwanted email, or spam.

Figure 2:
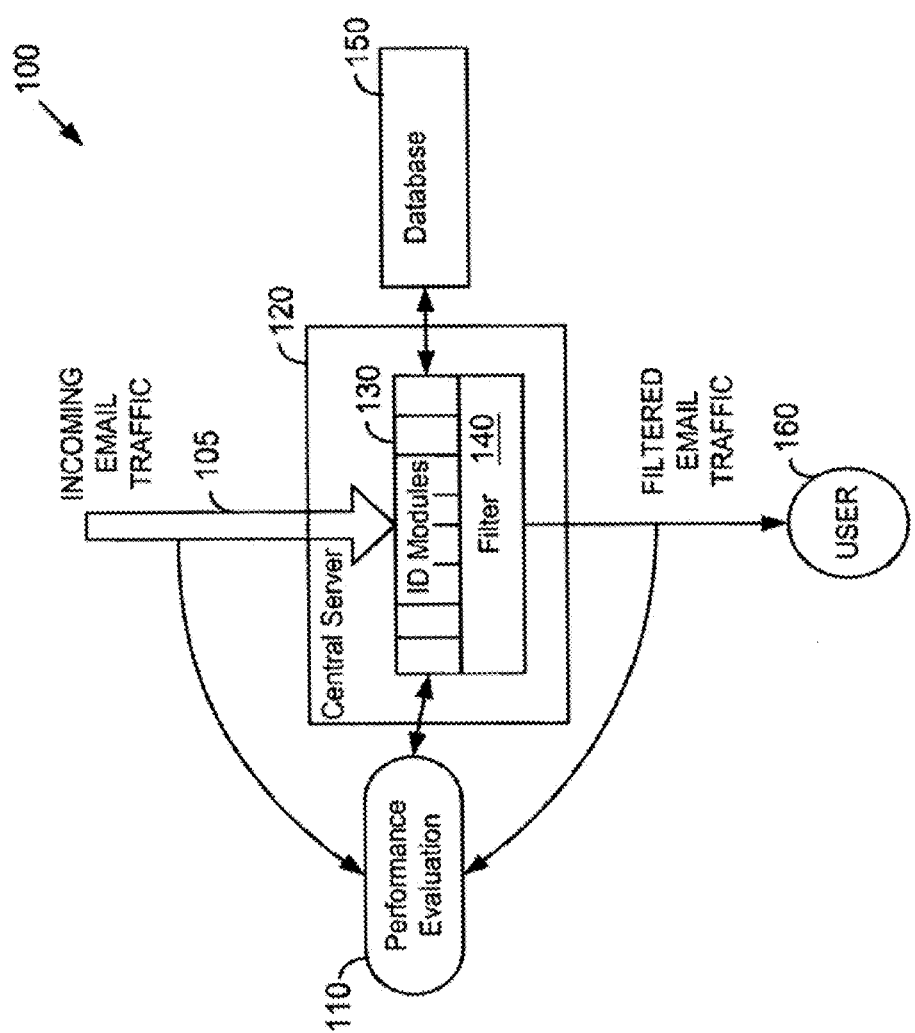
FIG. 2 illustrates basic processing and information transfers according to a preferred embodiment of the present invention.

FIG. 2 illustrates basic processing and information transfers according to a preferred embodiment of the present invention.

In FIG. 2, system 100 includes central server 120 for receiving incoming email traffic 105. Incoming email traffic is processed by identification (ID) modules 130. ID modules 130 can each be independent processes, devices or other types of functionality that are designed to evaluate the similarity between two or more email messages, or between an email message and other reference data. For example, a module can be a software process that determines a word count in the body of an email message. Another module can eliminate minor differences in grammar and language properties (e.g., eliminating the distinction between number, tense and person in grammar) and then subject the email text to a hash function. Another module type can use a database to assign values to words and compute an overall value to an email message or other information in an email transmission. Another module type can attempt to deduce meanings or concepts conveyed in an email message. In general, any type of module that performs a comparison on an email message in an attempt to find a level or degree of "sameness" of the email message with other email messages or with a reference datum or data structure can be employed.

Modules 130 are used to produce a value or values that indicate the degree of certainty that the module assigns to an email message to indicate whether the email message is matched to another email message or group of email messages (referred to as a category). In a preferred embodiment, a module can merely produce a "match" or "no match" with a message category. For example, there maybe tens or hundreds or more different categories to which a candidate email message may be compared. Each module can produce a conclusion as to whether the candidate email message is matched to one or more of the categories. Alternatively, the modules can produce a "degree of certainty" value (e.g., from 0 to 100) that indicates the degree to which the module ascertains that the message is the same as the messages in each category. Other types of module comparisons and types of module output are possible. Typically, the checking for sameness is performed against one or more messages, or other information representing message content, obtained from a source such as database 150.

Filter 140 uses the results of the module comparisons to determine whether the email traffic is delivered to a user such as user 160. Messages that are delivered, or "passed," are considered legitimate, or desired, messages. Messages that are undelivered are said to be blocked, or undesirable, messages. In a preferred embodiment, filter 140 performs a spam check on messages that are considered to be "bulk" messages. Bulk messages are those messages in a category that contains over X messages, where X is a predetermined number. Messages that are not bulk messages are automatically passed through to the intended recipient, or user. Bulk messages, on the other hand, are subjected to further scrutiny and checking to determine whether the messages are spam. Typically, this is a determination as to whether the message is of a commercial nature, i.e., is designed to benefit the sender monetarily or in some other fashion. The spam checking can be by any means as is known in the art.

Ideally, a system would be able to tell with certainty whether a message is bulk or not. In such a case, all non-bulk messages can be considered as not spam. However, since the bulk detection is not perfect, a preferred embodiment uses the probability that email is bulk combined with the probability that the email may be spam to derive the overall probability that email is bulk and spam.

Performance evaluation 110 is a process that assesses the success or failure of specific modules to detect a match of email. For example, if a module has determined that an email message is the same as other email messages in category 1, and a benchmark evaluation reveals that the message is actually NOT the same as the email messages in category 1, the module is said to have failed at the matching process. Modules that fail more frequently than desired can be removed from use, or if they are still used less weight can be given to their conclusions. On the other hand, modules which are more successful than others can be weighted more heavily than other modules so that the successful modules have more influence in the overall decision of sameness than other modules. Completely useless or redundant modules can be removed. A module X is redundant if there exists another module Y which is right whenever module X is right. A partially useless module may still be deleted if the incremental value that it provides does not justify the cost of executing the module.

A benchmark evaluation can be achieved manually, as where it is performed by a human editor. Such an approach can periodically have a human editor review categorized email messages and determine if the sorting is proper. Module decisions as to the category can then be compared against the human editor and modules can be rated accordingly. Inter-module checking can also be performed where if a module often decides contrary to other modules, especially when the other modules are weighted highly, then the contrary module can be de-rated, or given a lower weighting in the overall result. A preferred embodiment uses Bayesian analysis to achieve this "tuning" of the module selection and weighting.

Module tuning and sameness checking can be applied to spam checking in addition to bulk detection. A preferred embodiment of the invention uses a process called the Spam-Repute Engine that uses the "sameness" method. If one message is identified to be spam, then all messages which are identified as the "same" as that message are also classified as spam. If one message is identified to be legitimate, then all messages which are identified as the "same" as that message is also legitimate.

Table I shows examples of different ID modules used to perform sameness checking.

TABLE I

| Module Name | Description |
| --- | --- |
| Nilsimsa | Uses nilsimsa fingerprints |
| DCC | Uses DCC checksums of messages, utilizes dccproc to get checksums |
| WordsWB | Using the whole message body, this module creates a hash |
| WordsF2K | Using only the first 2K bytes of the message body, this module creates a hash |
| WordsHB | Using only the first half of the message body, this module creates a hash |

Table II shows performance measurements of the modules in Table I.

TABLE II

| (a) Module Name | (b) #says matches and is right | (c) #says matches and is wrong | (d) #says not matches and is right | (e) #says not matches and is wrong | (f) Bayesian Computed weight |
| --- | --- | --- | --- | --- | --- |
| Nilsimsa | 4317 | 5679 | 11691 | 813 | 0.87 |
| DCC | 2439 | 0 | 17370 | 2691 | 0.88 |
| WordsWB | 4571 | 669 | 16701 | 559 | 0.96 |
| WordsF2K | 4560 | 750 | 16620 | 341 | 0.98 |
| WordsHB | 4825 | 836 | 16534 | 305 | 0.98 |

In Table II, a determination as to whether the module is actually right or wrong is based on a human editor's decision as to whether the messages are the "same." One way to calculate a weight to assign to a module based on the results of Table II can be performed as follows (using the values denoted by the letters in parentheses in each column of Table II):

$$ID \text{ Module sameness probability} = \frac{\left(\frac{b}{(b+c)}\right)}{\left(\frac{b}{(b+c)} + \frac{e}{(d+e)}\right)}$$

The calculation above is computed for each module used in a group of modules (e.g., ID modules 130 of FIG. 2) to evaluate sameness. Then, the preferred embodiment uses the overall "sameness" probability derived by combining the results of all of the modules using a chi-squared probability scheme which is described, for example, at http://mathworld.wolfram.com/Chi-SquaredDistribution.html. There are many other alternative schemes to combine the module results and any suitable approach can be used.

By assuming that messages with a computed 99% or greater combined sameness probability are the same and those with a 1% or less combined sameness probability are not the same, the message sample can be used to tune the weights of the individual ID modules. In order to start a comparison process to determine if an email message is spam, it may be necessary to make a determination about at least one instance of the email message. One way this can be done is by observation and flagging an email as spam by a human editor. Another method is to allow a user or group of users to "vote" on whether the email is spam. The votes can be cross referenced by the ID modules, weighted by a user's reputation and tallied.

Other ways to perform initial classification can include so-called "relay honeypots" and "proxy honeypots" to obtain information about an email message or email sender. Another approach can use sender authentication and permit messages from authenticated senders, or with approved digital signatures, to be passed as legitimate, non-spam, email.

The Source Code Appendix includes examples of ID modules and a routine to manage the application of the modules to determine sameness among email messages.

One feature of the present invention allows a central server to hold messages for a time before delivery. In this manner a group of messages can be compared for sameness before they are delivered to the intended recipients. This can be useful, for example, to make a bulk email determination since the threshold criterion for bulk email delivery might be tens of thousands of messages but an email spammer may only send out a few hundred messages at a time so that the bulk detection could not occur until after a reasonable time interval (e.g., 1 hour). If the non-bulk messages are not delayed, then all messages below the bulk threshold will always be treated as non-bulk. The time period for holding email messages pending delivery in order to detect bulk email can vary according to any of a number of factors. For example, a user may designate certain types of email (e.g., from known senders) to be delivered immediately. The number to be held could be proportional to the historical number of messages needed for actual bulk messages to exceed the bulk threshold. Email from senders who are not on the immediate delivery list can be held for a predetermined time period. The time period for holding can also be increased gradually as the number of matches for a category grows or based on the content of the message. Other ways to set or vary the hold time are possible.

A contemplated embodiment of the invention envisions a master server performing the performance evaluation function shown in FIG. 2. The results of performance evaluation can be sent to one or more other servers so that the other servers are not burdened with the potentially time and resource-consuming operation of evaluating the modules. The master server can make recommendations on module weighting and can phase in or out modules for use in bulk detection and/or spam detection. Module definitions and module related databases are synchronized between the client and server.

Another feature allows for users to set parameters that deal with tuning sameness engines for either bulk mail detection or spam detection. For example, a user may want to include or exclude certain modules, or to manually assign different weights to different modules. This can be useful, for example, where a user wants to receive certain types of email that might otherwise be blocked as spam. A user can be allowed to set any of a number of parameters in the system, such as the threshold number of email messages in a category before the category is considered to be bulk email. Note that many different users can each have a different threshold number so that the same category of email messages can be considered bulk (or spam) or not on a user-by-user basis. Subsequent processing or detection of spam or other characteristics of email can proceed, accordingly, on the same user-by-user basis. User selection or setting of parameters can be by typing in a numerical value, selection of a menu option, activation of a button or slider control, or by any other means as is known in the art. If a continuous function is converted into a discrete function, the confidence level determines the threshold by which the conversion is performed. For example, if the probability is 99 and the confidence level is 98, then the result can be converted into a definite 100.

Although the invention has been discussed with reference to specific embodiments thereof, these embodiments are illustrative, and not restrictive, of the invention. For example, although the invention is discussed primarily with respect to email messages, other types of information exchange or transfer can similarly benefit. For example, so-called pop-up web pages or dialog boxes can be subjected to sameness testing and filtering. Items attached to email messages can be analyzed as can web pages, files, images, or other data items or structures.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium or transmission that can contain, store, communicate, propagate, or transport the program for use by or in connection with the instruction execution system, apparatus, system or device. The computer readable carrier can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in the following claims and/or to the particular embodiment disclosed as the best mode contemplated for carrying out this invention, but that the invention will include any and all embodiments and equivalents falling within the scope of the appended claims.

What is claimed is:

1. A method for analyzing email messages, comprising:
    (a) providing multiple modules each one of which is configured to analyze email messages in a different manner than other ones of the modules;
    (b) for each of a plurality of received email messages, using a plurality of the modules to each independently determine a module output indicative of a level of sameness of the received email message with one or more prior email messages, wherein at least two of the modules being used are each assigned a non-zero weight indicative of the performance level of the module;
    (c) for each of the plurality of received email messages, determining an overall level of sameness of the received email message with one or more prior email messages by combining the module outputs of at least two of the plurality of modules using the non-zero weights assigned to the modules;
    (d) monitoring performance levels of the modules; and
    (e) adjusting the non-zero weights of at least two of the modules based on their performance levels;
    wherein at least one of steps (a), (b) and (c) is performed using at least one processor.

2. The method of claim 1, further comprising:
classifying each of the plurality of received email messages into one of a plurality of different categories by determining, based on the overall level of sameness determined for the received email message, whether the received email message is considered the same as one of the one or more prior email messages that has already been classified into one of the categories;
    if the received email message is not considered the same as one of the one or more prior email messages that has already been classified into one of the categories, then performing a set of computations to thereby classify the received email message into one of the categories; and
    if the received email message is considered the same as one of the one or more prior email messages that has already been classified into one of the categories, then classifying the received email message in the same category as the prior email message that the received email message is considered to be the same as, without performing the set of computations for the received email message.

3. The method of claim 1, further comprising:
classifying each of the plurality of received email messages into one of a plurality of different categories by performing a set of computations, at least one of which uses the overall level of sameness determined for the received email message in a computation.

4. The method of claim 1, wherein the adjusting of the non-zero weights of at least two of the modules at step (e) includes increasing the non-zero weight of at least one of the modules and reducing the non-zero weight of at least another one of the modules.

5. The method of claim 1, wherein the adjusting of the non-zero weights of at least two of the modules at step (e) is performed using Bayesian analysis.

6. The method of claim 1, wherein:
step (d) includes measuring the performance of at least two of the modules against a known standard using Bayesian analysis; and
step (e) includes adjusting the non-zero weights of at least two of the modules using results of the Bayesian analysis.

7. The method of claim 1, further comprising:
(f) discontinuing use of one or more of the modules, based on the performance levels of the modules.

8. The method of claim 7, wherein:
step (f) includes discontinuing use of a lowest performing one of the modules.

9. The method of claim 1, further comprising:
(f) discontinuing use of one or more of the modules determined to be redundant.

10. The method of claim 1, further comprising:
(f) discontinuing use of one or more of the modules, based comparisons of incremental values that the modules provide to costs of executing the modules.

11. The method of claim 10, wherein:
step (f) includes discontinuing use of a said module, whose incremental value that the said module provides does not justify the cost of executing the said module.

12. The method of claim 1, wherein each of the modules determines a single module output for each of the plurality of received email messages.

13. A system for analyzing email messages, comprising:
one or more computer implemented processor for executing instructions included in one or more non-transitory machine-readable medium, the one or more non-transitory machine-readable medium including:
instructions for providing multiple modules each one of which is configured to analyze email messages in a different manner than other ones of the modules;
instructions for receiving email messages;

instructions for using a plurality of the modules to each independently determine a module output indicative a level of sameness of each of a plurality of received email messages with one or more prior email messages, wherein at least two of the modules being used are each assigned a non-zero weight indicative of the performance level of the module;

instructions for determining, for each of the plurality of received email messages, an overall level of sameness of the received email message with one or more prior email messages by combining the module outputs of at least two of the plurality of modules using the non-zero weights assigned to the modules;

instructions for monitoring performance levels of the modules; and instructions for adjusting the non-zero weights of at least two of the modules based on their performance levels;

wherein the one or more non-transitory machine readable medium stores the instructions.

14. The system of claim 13, further comprising:
instructions for classifying each of the plurality of received email messages into one of a plurality of different categories, including
   instructions for determining, based on the overall level of sameness determined for the received email message, whether the received email message is considered the same as one of the one or more prior email messages that has already been classified into one of the categories;
   instructions for performing a set of computations to thereby classify the received email message into one of the categories, if the received email message is not considered the same as one of the one or more prior email messages that has already been classified into one of the categories; and
   instructions for classifying the received email message in the same category as the prior email message that the received email message is considered to be the same as, without performing the set of computations for the received email message, if the received email message is considered the same as one of the one or more prior email messages that has already been classified into one of the categories.

15. The system of claim 13, further comprising:
instructions for classifying each of the plurality of received email messages into one of a plurality of different categories by performing a set of computations, at least one of which uses the overall level of sameness determined for the received email message in a computation.

16. The system of claim 13, wherein the instructions for adjusting of the non-zero weights of at least two of the modules includes instructions for increasing the non-zero weight of at least one of the modules and reducing the non-zero weight of at least another one of the modules.

17. The system of claim 13, wherein the instructions for adjusting of the non-zero weights of at least two of the modules includes instructions for using Bayesian analysis.

18. The system of claim 13, wherein:
the instructions for monitoring performance levels of the modules includes instructions for measuring the performance of at least two of the modules against a known standard using Bayesian analysis; and
the instructions for adjusting the non-zero weights of at least two of the modules based on their performance levels includes instructions for adjusting the non-zero weights of at least two of the modules using results of the Bayesian analysis.

19. The system of claim 13, further comprising:
instructions for discontinuing use of one or more of the modules, based on the performance levels of the modules.

20. The system of claim 19, wherein the instructions for discontinuing use of one or more of the modules includes instructions for discontinuing use of a lowest performing one of the modules.

21. The method of claim 13, further comprising:
instructions for discontinuing use of one or more of the modules determined to be redundant.

22. The system of claim 13, further comprising:
instructions for discontinuing use of one or more of the modules, based comparisons of incremental values that the modules provide to costs of executing the modules.

23. The system of claim 22, wherein the instructions for discontinuing use of one or more of the modules includes instructions for discontinuing use of a said module, whose incremental value that the said module provides does not justify the cost of executing the said module.

24. The system of claim 13, wherein each of the modules determines a single module output for each of the plurality of received email messages.

25. A system for analyzing email messages, comprising:
multiple modules each one of which is configured to analyze email messages in a different manner than other ones of the modules; and
a server configured to receive email messages;
wherein a plurality of the modules are used to each independently determine a module output indicative a level of sameness of each of a plurality of received email messages with one or more prior email messages;
wherein at least two of the modules being used are each assigned a non-zero weight indicative of the performance level of the module; and
wherein the server is configured to determine an overall level of sameness of each of the plurality of received email messages with one or more prior email messages by combining the module outputs of at least two of the plurality of modules using the non-zero weights assigned to the modules;
wherein the server is configured to monitor performance levels of the modules; and
wherein the server is configured to adjust the non-zero weights of at least two of the modules based on their performance levels.

26. The system of claim 25, wherein the multiple modules are independent processes that are implemented by the server.

27. The system of claim 25, wherein each of the modules determines a single module output for each of the plurality of received email messages.

* * * * *